April 19, 1932.   F. KEMPTER   1,854,200
HEATING AND COOLING MANTLE
Filed Jan. 16, 1930   2 Sheets-Sheet 1

INVENTOR
Fritz Kempter

April 19, 1932.  F. KEMPTER  1,854,200
HEATING AND COOLING MANTLE
Filed Jan. 16, 1930    2 Sheets-Sheet 2
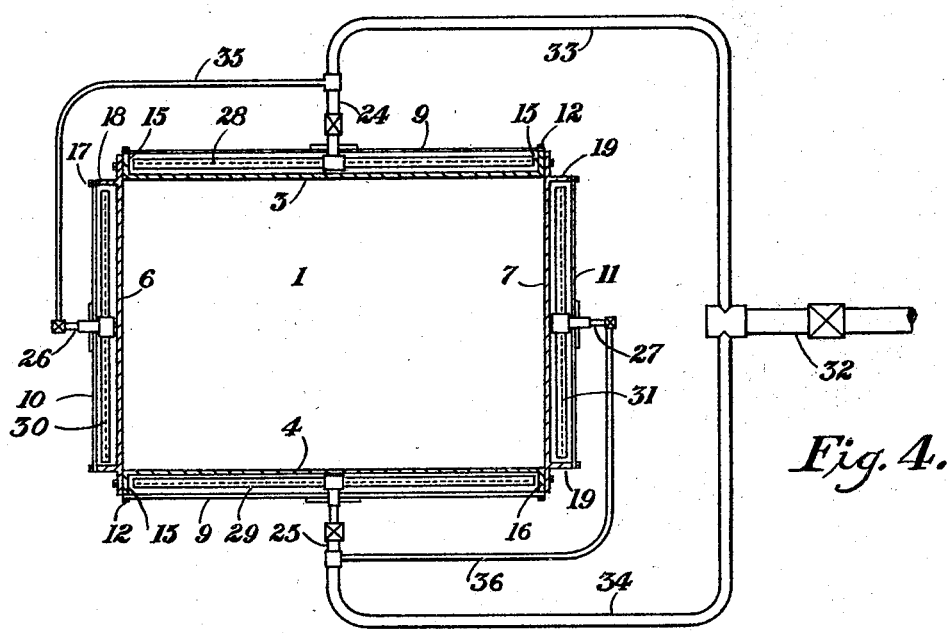
Fig. 4.
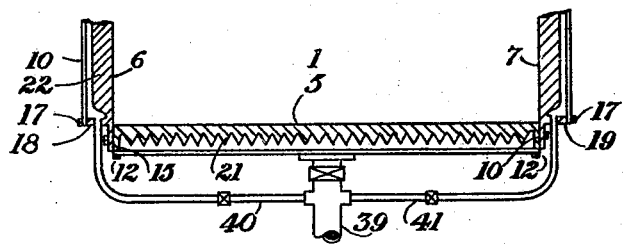
Fig. 5.
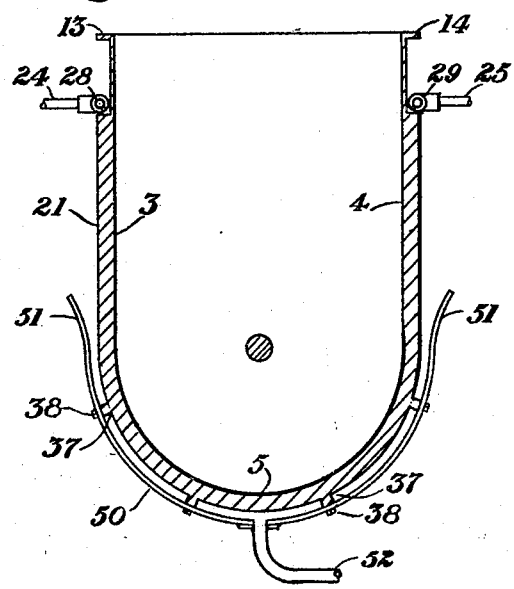
Fig. 6.
INVENTOR
Fritz Kempter Patented Apr. 19, 1932

1,854,200

UNITED STATES PATENT OFFICE

FRITZ KEMPTER, OF STUTTGART, GERMANY, ASSIGNOR TO BAKER PERKINS COMPANY, OF SAGINAW, MICHIGAN, A CORPORATION OF NEW YORK

HEATING AND COOLING MANTLE

Application filed January 16, 1930, Serial No. 421,181, and in Germany February 16, 1929.

This invention relates to means for heating and cooling mixing machines and like apparatus or vessels with their contents by means of heating or cooling mediums which act on their outer surfaces, and may be liquid or gaseous.

The object of my invention is to increase the effect of these mediums on the contents to be treated and thereby greatly decrease the costs and duration of the operation.

The materials contained in the mixing trough, vessel or the like, herein generally called "trough", are usually heated or cooled by passing a heating or cooling medium through the spaces between the walls of the trough and a mantle surrounding the same at a suitable distance therefrom. The walls of such a trough are generally made of metal, usually of iron plate, cast iron or steel, and their inner surface, which is in contact with the material under treatment, as well as their outer surface, which is surrounded by the mantle are usually practically smooth.

My invention consists therein, that I increase the heat-transferring area of the outer surface of the walls of the trough by providing thereon projections, corrugations or the like, herein generally called "projections," extending outwardly and downwardly therefrom, adjacent projections forming channels running, preferably vertically, down the walls of the trough to and along its bottom and preferably set closely to each other and of equal height. The heating or cooling medium is spread all over the projections of the walls, entering just above their upper ends preferably through suitable distributors arranged in the space between the top of the trough and the upper ends of the channels formed by the projections. In most cases a mantle surrounding the trough and its projections is employed to retain the heating or cooling medium therein to exhaust as completely as possible its effect, whereafter it is removed from the space between the mantle and the trough by a suitable outlet. The inner surface of the mantle is positioned at a suitable distance from the outer tops of the projections or the like according to the length of time the heating or cooling medium is to be retained in the mantle.

The accompanying drawings serve for more minutely explaining my invention by showing by way of example the construction of a mixing trough, to which my invention has been applied.

In the drawings—

Fig. 4 is a horizontal section on line 4—4 of Fig. 2, showing at the same time the arrangement of the inlet pipes of the heating or cooling medium;

Fig. 5 shows the arrangement of the outlets of the heating or cooling medium from the trough; and Fig. 6 shows the vertical section of a mixing trough, in which a liquid heating or cooling medium is used and thereafter collected and removed by means of a catch shaped like a small mantle.

Figure 2:
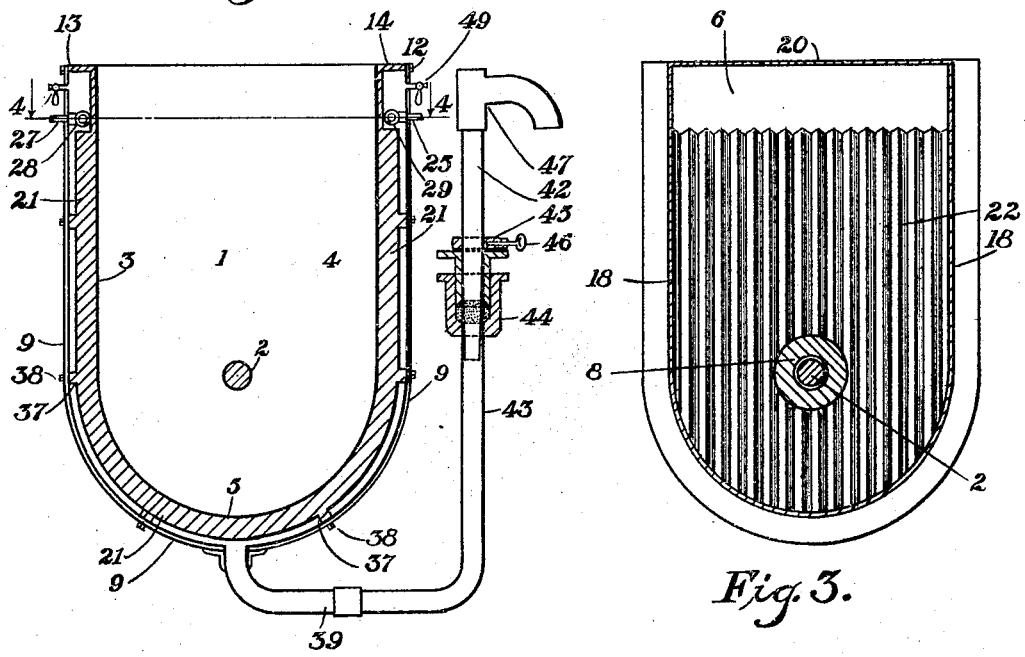
Fig. 2 is a vertical section on line 2—2 and Fig. 3 on line 3—3 of Fig. 1.
Figure 3:
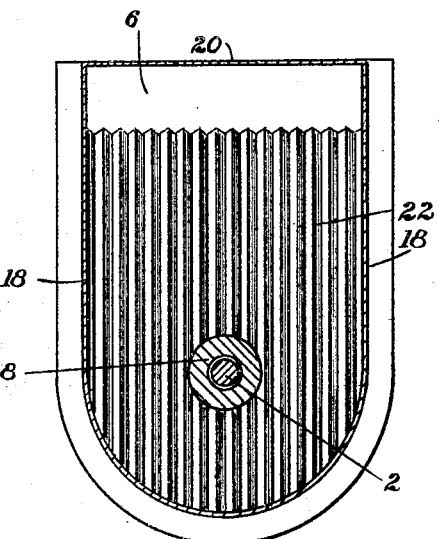

Referring in detail to the different views, the numeral 1 designates the mixing trough and 2 the horizontal agitator shaft carrying the mixing blades, which are not shown. The trough 1 consists of the upright side walls 3 and 4, the half-cylindrical bottom 5, all cast in one piece, and the upright end walls 6 and 7, in which the bearings 8 for the agitator shaft 2 are provided, and which are fixed to the side flanges of the side walls and bottom in the usual way. The mantle surrounding the trough 1 is made of sheet iron and rigidly and tightly fixed to flanges and projections provided at the walls of the trough. The mantle is thereby divided into three sections, 9 surrounding the upright side walls 3 and 4 and the bottom 5 of the trough, and 10 and 11 covering the end walls 6 and 7 respectively. The mantle section 9 is fixed by suitable screws 12 at its top ends to the top flanges 13 and 14 and at its sides to the side flanges 15 and 16 of the side walls 3 and 4 respectively. The mantle sections 10 and 11 are fixed by screws 17 to projections 18 and 19 extending from the end walls 6 and 7 in line with the sides of the side walls and bottom of the trough, and to their top flanges 20.

Within the three spaces thus formed for the passage of the heating or cooling medium between the three sections of the mantle and the walls of trough 1, the outside surfaces of the latter are provided with projections, corrugations or the like integral therewith and extending towards the inner surfaces of the corresponding mantle sections, but not touching the latter. The projections 21 extend from the inner surface of the side wall 3, bottom 5 and side wall 4 of the trough and are covered by section 9 of the mantle; the projections 22 extend from the end wall 6 and are covered by mantle section 10, and the projections 23 extend from the end wall 7 and are covered by mantle section 11.

All these projections shown in the drawings are constructed as rather sharp corrugations arranged in vertical ridges parallel to each other and practically side by side, their outer tops being substantially of equal height and at an equal distance from each other, the interstices between the outer tops of the projections and the inner surfaces of their corresponding mantles being such that the heating or cooling medium passing downward in the channels formed by the projections has the desired effect on all parts of the contents of the mixing trough. The projections 21 extending from the side walls and bottom of the trough are continuous, while those projections 22 and 23 surrounding the bearings 8 on the end plates 6 and 7 respectively, are divided, where required, into two parts, each ending a small distance from the bearings 8, so that the heating and cooling medium can pass freely round the same.

All the projections 21, 22 and 23 extend within their corresponding heating or cooling spaces up to the entrance of the heating or cooling medium into the same at points situated at a suitable distance below the top of the trough 1. The medium is supplied to the mantle section 9, as shown in Fig. 4, by two pipes 24 and 25 provided at the opposite top parts of the same, and to the sections 10 and 11 at the top of each by pipes 26 and 27 respectively. The inlet pipes are preferably placed at the middle line of their corresponding sections and connected therein at their ends, each to a distributing pipe, nozzle or similar device, adapted to equalize the entrance of the heating or cooling medium into the rows of channels formed by the projections. The inlet pipes 24, 25, 26 and 27 end in the distributing pipes 28, 29, 30 and 31 respectively, and are supplied with the heating or cooling medium from the main supply pipe 32, the inlet pipes 24 and 25 being connected to the latter by the branch pipes 33 and 34 respectively, and the inlet pipes 26 and 27 to the branch pipes 33 and 34 by the smaller-bored branch pipes 35 and 36 respectively.

Any other way of connecting the main supply pipe 32 with the inlet pipes 24, 25, 26 and 27 may be employed. Pipe 32 and all the inlet and branch pipes are each provided with regulating valves in the usual way as indicated in Figs. 2, 4 and 5.

Figure 1:
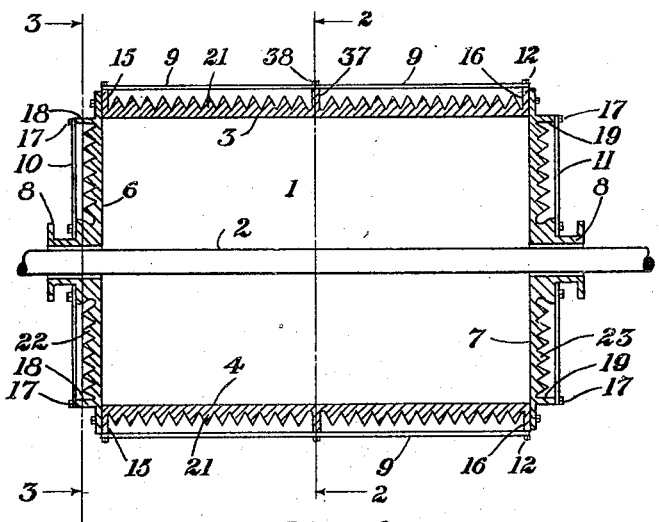
Fig. 1 is a horizontal cross section of the mixing trough and its mantle through the axis of its agitator.

In order to secure the curved plate forming the mantle section 9 rigidly, evenly and at the required distance over the projections 21, any single unit of the latter may be reenforced and prolonged at suitable points, as shown in Figs. 1 and 2, in which the mantle 9 is rigidly fixed on the reenforced parts 37 of the chosen projection by means of screws 38.

The outlets for the used heating or cooling medium from the three mantle sections are preferably provided at their bottoms, as shown in Figs. 2 and 5. The lowest point of that part of mantle section 9, which covers the bottom 5 of the trough, is provided with the main outlet pipe 39, to which the mantle sections 10 and 11 covering the end plates of the trough are connected by branch pipes 40 and 41 respectively. (Fig. 5).

The above described construction, as shown in Figs. 1–5, serves equally well for liquid as for gaseous heating or cooling mediums; only the main outlet pipe 39 is differently arranged. If a gaseous medium is used, the outlet pipe 39 leads the used gases directly into the atmosphere or to any other destination, as the circumstances require, and the inlet pipe for the gas and its outlet after use may be differently arranged as required or convenient.

If a liquid heating or cooling medium is employed, the outlet pipe 39 is preferably turned upwards to the required level of the liquid within the mantles. In order to make the outlet point of this pipe adjustable, its upright part may be made of two tubes 42 and 43. The upper one, 42, slides tightly in the lower one, 43, and is secured in its position by means of the stuffing box 44 rigidly fixed to the top of pipe 43 and of a ring 45 resting thereon and fixed to tube 42 by a thumb screw 46. By adjusting the position of ring 45 on pipe 42, the height of the outlet 47 of tube 39 is regulated, and thereby the level of the liquid in the mantle.

The main supply pipe of the heating or cooling medium, all the inlet and outlet pipes of the mantle and their branch pipes are provided with suitable regulating valves in the ordinary way, and by means of their adjustment the velocity of the current and the quantity of heating or cooling medium passing through the mantle are controlled.

When the heating or cooling liquid first enters the spaces between the mantle sections and the walls of the trough, air contained in these spaces is removed by means of small air escape cocks located at the top part of each section above the inlet of the liquid medium, as is shown in Fig. 2, where the two small air cocks 48 and 49 are arranged for this purpose at the two opposite top parts of mantle section 9.

In cases where a not-obnoxious liquid, for instance water, is used as heating or cooling medium, it is frequently found advantageous not to use a complete mantle as described, but to place a curved catch 50 shaped like a small mantle underneath the bottom 5 of the trough to collect the used liquid, as shown in Fig. 6. The curved mantle or catch 50 is fixed in its position solely by means of reenforced parts 37 of suitable single projections and of screws 38, as described above, and may be provided with flared prolongations 51. The outlet pipe 52 serves for the removal of the used liquid.

It will be understood by all those versed in the art, that the projections or corrugations increasing the area of the heat-transferring surface of the walls of the trough, may have any other suitable shape, size and arrangement different from those shown in the drawings, that the mantle may be of any other suitable construction, and that its sections may be subdivided into smaller sections so as to cause in them alternately an upward and downward current of the heating or cooling medium, which would allow to locate the outlets for the used medium also at the top of the mantle, without departing from the scope of the invention as defined in the following claims.

I claim:

1. A mixing machine or similar apparatus having in combination an upright trough with open top, a closed mantle completely surrounding the walls of said trough substantially parallel thereto, projections extending from the outer surface of the walls of said trough up to some distance from the top of the latter and adapted to increase the heat-transferring area thereof and to form channels running vertically downward the walls and along the bottom of said trough, the tops of said projections being spaced from the inner surface of said mantle, inlets for the heating or cooling medium arranged at said mantle at points between the top of said trough and the upper ends of said projections, distributors connected to said inlets within said mantle so as to spread and disperse a heating or cooling medium all over said projections, and an outlet arranged at the lowest point of said mantle for the escape of the medium having been used therein.

2. A mixing machine or similar apparatus having in combination an upright trough with open top, projections extending from the outer surface of the walls of said trough up to some distance from the top of the latter and adapted to increase the heat-transferring area thereof and to form channels leading downwardly to the lowest part of said trough, means located between the top of said trough and the upper ends of said projections and so adapted as to distribute, disperse and spread a heating or cooling liquid all over along the channels formed by said projections, a catch placed underneath the bottom of said trough so as to collect the heating or cooling liquid after it has been used, and an outlet pipe arranged at the lowest point of the said catch for the removal therefrom of the used liquid.

3. A mixing machine or similar apparatus having in combination a trough, projections extending downwardly from the outer surface of the walls of said trough and having such a shape and size and so arranged as to increase the heat-transferring area thereof, a mantle surrounding said trough at some distance from the tops of said projections, supports of the said mantle consisting of prolonged reenforcements provided at suitable points of the upper part of any of said projections, extending against the inner surface of said mantle and adapted to be affixed thereto, means for distributing, dispersing and spreading a heating or cooling medium all over said projections within said mantle, and an outlet in the latter for the removal of the used medium.

4. A mixing machine or similar apparatus having in combination an upright trough with open top, a closed mantle completely surrounding the walls of said trough, projections extending from the outer surface of the walls of said trough up to some distance from the top of the latter and having such a shape and size and so arranged as to increase the heat-transferring area thereof and to form downwardly leading channels, the tops of said projections being spaced from the inner surface of said mantle, inlets for a heating or cooling liquid arranged at that space of said mantle situated between the top of said trough and the upper ends of said projections, air cocks provided at the same space of said mantle, distributors connected to said inlets within said mantle and adapted to disperse and spread a heating or cooling liquid all over said projections, an opening arranged at the lowest point of said mantle, a pipe connected to said opening and bent upwardly, a second pipe arranged to form a prolongation of the first-named pipe, mounted slidably thereon and having at its upper part an outlet for the escape of the used liquid, and means for adjusting the position of the said slidable pipe to the first-named pipe, and thereby the point of outlet for the used liquid and the level of the active heating or cooling liquid within the mantle.

5. A mixing machine or similar apparatus having in combination an upright mixing trough to be heated or cooled, projections provided at the outer surfaces of the walls of said trough, adapted to increase the heat transferring area of these surfaces, and forming ridges equal in height and extending vertically downward the walls and along the bottom of said trough with deep channels between adjacent projections, a mantle surrounding said trough at a distance from said projections, means for distributing and spreading a heating or cooling medium all over said projections and channels within said mantle, and an outlet provided in the latter for the removal of the used medium.

6. A mixing machine or similar apparatus having in combination an upright mixing trough square at its top and upper part and composed of three parts: the body part consisting of its two sides and of its curved bottom and provided all round with flanges, and two end plates flanged at their top, extending over the side and bottom flanges of the body part and each provided with an outwardly pointing projection in outline with the ends of the body part of said trough, a mantle completely enclosing the said trough and composed of three parts: one part surrounding the sides and bottom of said trough and fixed to the ends of the flanges thereof, and two end parts fixed to the top flanges and to the projections extending therefrom, a bushing coaxial with the axis of the curved bottom of said trough, adapted to carry the shaft of the mixing blades provided in the latter and passing through the end plates of said trough and the end parts of said mantle, outwardly pointing vertical projections provided on the outer surfaces of the said trough within each of the three parts of said mantle, spaced at their outer tops from the latter and arranged in four sections: two running downward from a point at some distance from the top flanges of the opposite sides of the body part of said trough and, round its curved bottom, where they meet, and each of the two other sections running down from a point at some distance from the top flange of the end plates of said trough and intersected by the said bushings, pipes leading the heating or cooling medium into each of the four spaces between the said trough and said mantle, containing the four sections of said projections, at points between the upper ends of the latter and the top flanges of the two sides and the two end plates of said trough, an outlet pipe provided at the lowest point of the curved bottom part of said mantle, and branch pipes connecting said outlet pipe with the lowest points of the end parts of said mantle, the said outlet pipe and the said branch pipes serving for the removal of the used heating or cooling medium.

7. A mixing machine or similar apparatus having in combination an upright trough, the inner surface of which is substantially smooth, projections extending downwardly on the side and end walls and along the bottom of said trough from the outer surfaces thereof and integral therewith, a mantle surrounding said projections, which are situated at the bottom and that part of the side and end walls of said trough, at which a mantle is required according to the conditions of the operation, the tops of said projections being spaced at a small distance from the inner surfaces of said mantle, which distance is determined by the qualities of the heating or cooling fluid employed, means to distribute and spread the heating or cooling fluid all over said projections and the channels therebetween, and means to remove the used fluid.

FRITZ KEMPTER.